Aug. 13, 1935.    W. S. FISHER    2,011,549
SLEEVE VALVE ENGINE AND OILING MEANS
Filed April 2, 1927    3 Sheets-Sheet 2
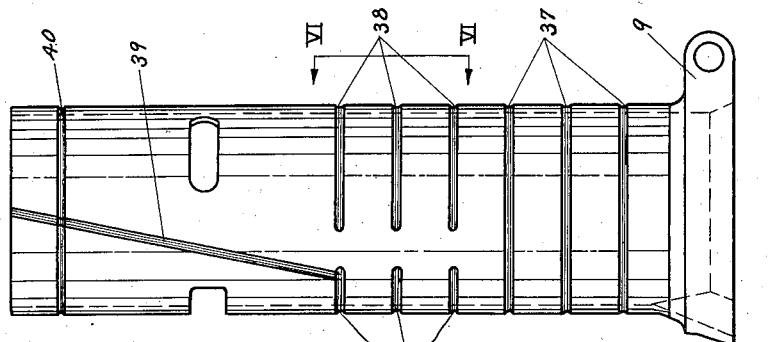
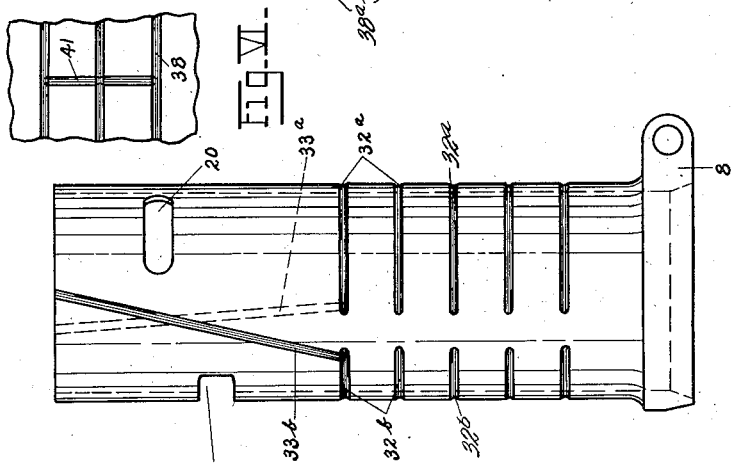
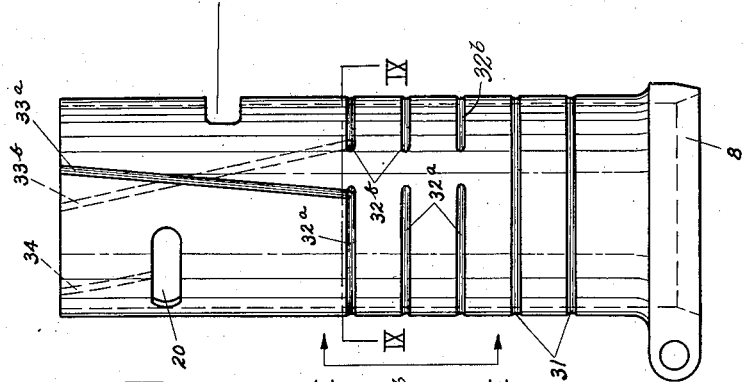
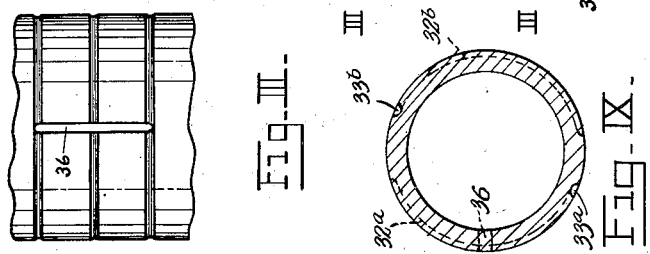
INVENTOR.
WALTER S. FISHER
BY Chester H. Braselton
ATTORNEY.

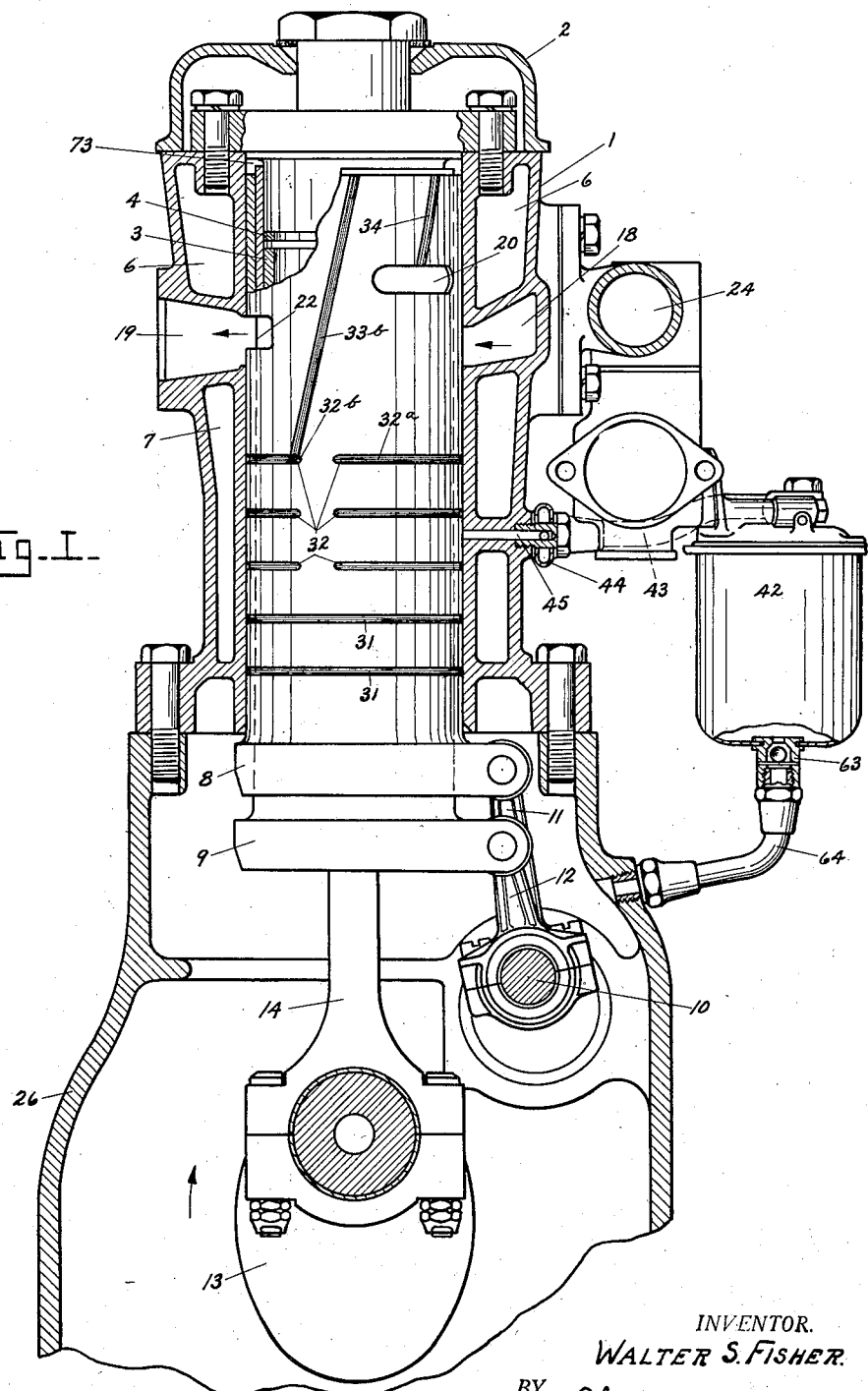

Aug. 13, 1935.    W. S. FISHER    2,011,549
SLEEVE VALVE ENGINE AND OILING MEANS
Filed April 2, 1927    3 Sheets-Sheet 3
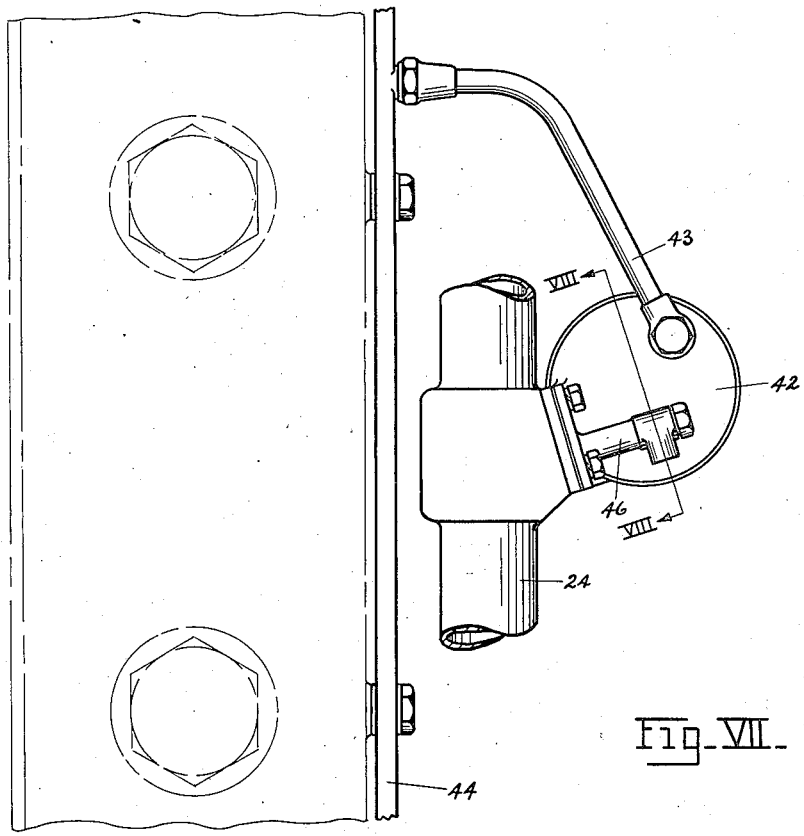
Fig. VII.
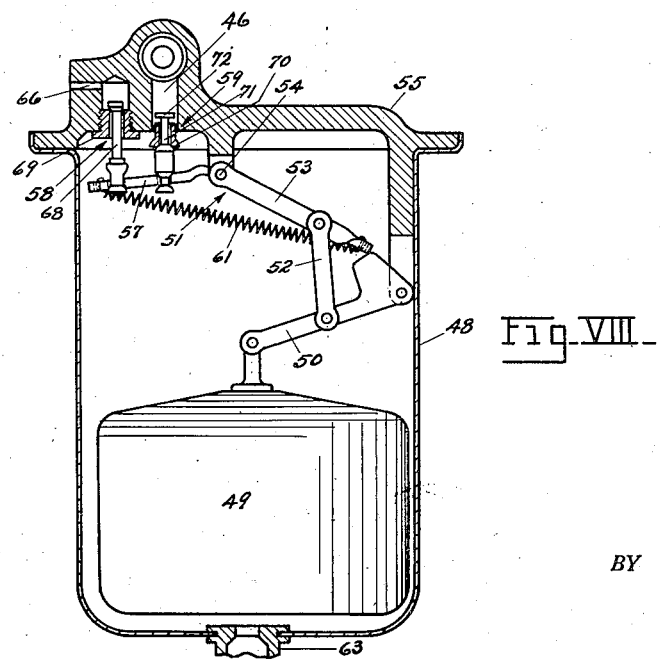
Fig. VIII.
INVENTOR.
WALTER S. FISHER
BY Chester H. Braselton
ATTORNEY.

Patented Aug. 13, 1935

2,011,549

UNITED STATES PATENT OFFICE 2,011,549

SLEEVE VALVE ENGINE AND OILING MEANS

Walter S. Fisher, Toledo, Ohio, assignor to The Willys-Overland Company, Toledo, Ohio, a corporation of Ohio Application April 2, 1927, Serial No. 180,457

4 Claims. (Cl. 123—196)

My invention relates to internal combustion engines of the so-called sleeve valve class and it has particular relation to the lubricative system for the reciprocating members within the cylinder block of such engines.

The principal object of the invention is to provide a sleeve construction by which adequate and proper lubrication of the sleeves is realized without incurring the dangers of overlubrication and the visible exhaust gas characteristics incident thereto.

Another object of the invention is to create a motor in which there is a definite predetermined flow or circulation of oil about the sleeves.

A further object of the invention resides in the provision of a lubricative system for engines of the above designated character in which adequate lubrication is had and in which any excess of oil that accumulates on the surface of the sleeves is withdrawn and returned to the crankcase for subsequent use. It is a further object of this invention to provide a system of lubrication in which a definite area of the sleeve is appropriated to the upward movement of oil, and the remaining area to the downward movement thereof; the apportionment between the two being to afford only sufficient surface for the upward movement of oil to lubricate the entire sleeve without causing an unnecessary accumulation of the lubricant upon any portion of its surface.

Another object of the invention is to provide a novel valved mechanism by which oil may be withdrawn from the cylinder with the aid of the partial vacuum created in the intake manifold, it being a further object of the invention to create a plural seated valve mechanism which is adapted to operate effectively against a comparatively large pressure differential. These together with other objects of the invention will become more apparent from a consideration of the drawings and the detailed description thereof hereinafter set forth.

The sleeves of internal combustion engines, particularly those of the Knight class, are dependent for their lubrication upon the oil which engages the exposed surface of the sleeves which projects into the crankcase of the engine. The oil there contacting the sleeves makes its way to the upper parts by means of the adhesive and capillary forces between the oil and metal aided by the reciprocative movement of the engine parts. By reason of the fact that the greater demand for lubrication is presented by the upper parts of the sleeves particularly that part neighboring the exhaust ports, a comparatively large quantity of oil is necessary about the lower part of the sleeve in order to lubricate that above satisfactorily. Considerable difficulty is experienced in providing the optimum quantity of oil by reason of the fact that most engines are operated at varying speeds. The avoidance of an excessive quantity of oil about the sleeves of the engine is not prompted solely by the consequent high oil consumption, but also by the fact that an appreciable quantity of lubricant thereby enters the combustion chamber through the sleeve ports and discharges with the exhaust gas to form a visible smoke.

To obviate these disadvantages I have provided a system of grooves for sleeves of the engine by which only a portion of the sleeve is available for the upward passage of oil. These grooves, however, are so arranged as to enable the oil to pass to the top of the sleeve readily, the remaining portion of the sleeve being so grooved or channeled as to centralize the excess oil and allow it to be withdrawn into an oil receiving receptacle. The receptacle operates under sub-atmospheric pressure and influences the flow of the oil over a large area of the sleeve, it being connected to the engine in the vicinity of the intake port in order to minimize the possibility of oil entering the combustion chamber.

For the purpose of withdrawing the oil from the cylinder, a receptacle or vacuum tank is connected to the intake manifold by means of a valved conduit and discharges the accumulation of oil by means of valves controlled by a float mechanism disposed within the container. To obviate the difficulties of operation which have been experienced heretofore with receptacles of this class, a dual seated valve member is provided whereby the seated members of the valve may be dislodged successively, the first seated member being of the comparatively small size and therefore more readily dislodged from its seat, whereas the second member which is of relatively larger area may be operated more readily after the pressure differential which exists between the source of vacuum and the container is decreased.

Referring to the drawings,

Figure I is an elevational view, partly in section, of a sleeve valve engine of the Knight type, and illustrates an embodiment of the principles of my invention which may be preferred;

Fig. II is an elevational view of the outer sleeve of the engine illustrated in Fig. I and indicates the manner of grooving the surface thereof;

Fig. III is a segmental view of the slotted area of the sleeve illustrated in Fig. II;

Fig. IV is an elevational view of the outer sleeve of a Knight engine embodying certain modifications over the construction illustrated in Fig. II;

Fig. V is an elevational view of the inner sleeve of a Knight engine;

Fig. VI is a segmental view of a part of the sleeve illustrated in Fig. V, which registers with the slot illustrated in Fig. III;

Fig. VII is a segmental plan view of a Knight engine illustrating the arrangement of the oil receptacle with respect to the engine and the intake manifold; and Fig. VIII is a sectional view on a somewhat larger scale, of the oil receptacle illustrated in Figs. I and VII, taken along the line VIII—VIII of Fig. VII.

Fig. IX is a transverse sectional view taken substantially on the line IX—IX of Fig. II showing an arrangement of transverse grooves in the outer sleeve.

In practicing my invention there is provided a cylinder casting 1, closed at its upper end by a head 2 which includes a sealing ring 3 and compression ring 4, and surrounded by water cooling chambers 6 and 7. Within the cylinder 1 are two reciprocating sleeves 8 and 9 which are driven by means of rods 11 and 12 respectively from an eccentric shaft 10. The inner sleeve 9 is the working barrel of the engine within which is a piston (not shown) that drives the crankshaft 13 through its connecting rod 14. The cylinder casting is provided with an inlet port 18 and an exhaust port 19, which periodically register with sleeve inlet ports 20 and exhaust ports 22. The inlet port 20 communicates with an intake manifold 24 which is common to all of the cylinders of the engine. A crankcase 26 supports the cylinder 1, houses the rotating parts and provides the usual storage space for a supply of lubricant.

The outer sleeve as illustrated in Fig. II includes two independent transverse endless grooves 31 near the base of the sleeve thereof, and two sets of transverse grooves, substantially parallel to the two lower grooves each set consisting of three individual or segmental grooves 32a and 32b. The longitudinally inclined grooves or channels 33a and 33b extend respectively from each of the uppermost transverse grooves of the sets 32a and 32b to the top of the sleeve, affording communication between the grooved portion of the sleeve and the chamber 73 formed by the cylinder and the depending head. The pressure within this chamber is preferably sub-atmospheric and is so maintained by one or more channels 34 which communicate between the chamber and the intake port.

As a modification of this embodiment, there is illustrated in Fig. IV a sleeve having no endless transverse grooves 31, such as are illustrated in Fig. II, nor is there provided a duct 34 corresponding to that illustrated in Fig. II by which communication is maintained between the chamber and the intake manifold. Both of the sleeves illustrated in Figs. II and IV respectively, however, are provided with a slot 36 which affords communication with the inner sleeve 9 illustrated in Fig. V. This sleeve includes three endless transverse grooves 37 and two sets designated respectively 38 and 38a, each set comprising three interrupted or segmental grooves corresponding to the grooves illustrated in Figs. II and IV. The longitudinal groove 39 extends from the uppermost segmental groove to the top of the sleeve and crosses an endless transverse groove 40, which may be provided near the top. A short vertical groove 41 on the inner sleeve registers with the slot 36 in the outer sleeve and interconnects the three parallel segmental grooves 38 on the intake port side of the inner sleeve.

The oil receptacle 42 is brought into communication with the sleeves by means of a tube 43 which interconnects the receptacle with an oil manifold 44, the manifold in turn communicating with the sleeves through openings 45 provided in the cylinder casting, that register with the slot 36 in the outer sleeve. The intake manifold 24 affords a convenient source of vacuum which is brought into communication with the receptacle 42 through a pipe 46.

In its essentials, the oil receptacle consists of a closed container 48 in which there is disposed a float member 49. An arm 50 is pivotally connected at one end to the float and at the other to the container and operates a quick acting toggle mechanism 51 through an interconnecting link 52, which is pivotally joined at each end to float arm 53 of the toggle and the arm 50 respectively. The toggle arms are pivoted from a stationary pin 54 which is mounted in a removable lid that constitutes a part of the container, the other arm of the toggle 57 operates an atmospheric valve 58 and a vacuum valve 59 and has secured to its free end a coil spring 61 which extends across to the free end of the other toggle arm 53.

The operation of this type of mechanism is well understood. Briefly, the valve arm 57 is held in a downwardly inclined position until the complementary arm 53 is raised slightly beyond the position in which the two arms bear a 180° relation to each other after which the spring 61 will cause the valve operating arm to swing upwardly. In order that the valve operating arm 57 be tripped downwardly again, the float arm 53 of the toggle mechanism must swing downwardly until it has pivoted just beyond a position in which it is again disposed at 180° with respect to the valve arm 57, then in its upwardly inclined position.

The receptacle or vacuum tank 42 is provided at its base with an automatically operated ball valve 63 which allows oil to discharge into the crankcase through a pipe 64 interconnecting the crankcase with the vacuum tank. In addition the two cooperative valves 58 and 59 are disposed in the lid 55 of the container which are operated by the valve arm of the toggle mechanism. One of the valves 58 controls a passageway 66 which leads to the atmosphere, whereas the other valve 59 is disposed in the end of the duct 46 which communicates with the intake manifold 24.

The atmospheric valve is of ordinary construction, consisting essentially of a shank 68 having an enlarged portion which extends within the tube and is adapted to engage a seat 69 that is screwed into the tube, and form a seal therewith. The valve is actuated vertically by the toggle arm 57 in timed relation with respect to the manifold vacuum valve 59.

The manifold valve, on the other hand, differs in its construction from that of the atmospheric valve in that it is provided with a plural seat. The valve includes a vertical shank 71 having an enlarged end upon which there is rested a flanged sleeve 70 that is slidably mounted on the shank. The inner flanged surface of the sleeve engages the enlarged end of the shank to form a seal therewith; the outer portion of the flange engages the edge of the duct 46 leading to the manifold. In order that the sleeve might be dislodged positively from its seated position the shank 70 is provided with a head 72 which engages the sleeve and forces it downwardly. It will be observed that the elements constituting the vacuum seal are displaced from their seated position successively thereby insuring the successful operation of the valve even though the pressure differential is high and the fluid is of viscous, adhesive consistency.

When the tank 42 is practically filled with oil and the float 49 is raised whereby the float arm assumes a position which is slightly beyond a 180° angular relation with the valve arm 57, the valve arm will spring upwardly thereby closing the manifold valve 59 and subsequently opening the atmospheric valve 58. The vacuum within the container is thus broken and the oil is automatically discharged through the valve 63 into the crankcase 26. After the float has been lowered again to a position which is substantially that illustrated in Fig. VIII, toggle member 57 will have been tripped whereby the atmospheric valve 58 is closed and the manifold valve 59 opened. A difference in pressure is thereby established causing the discharge valve 63 to seal automatically and the receptacle will resume its function as an oil withdrawing mechanism.

When an outer sleeve 8 of the construction illustrated in Fig. II is employed, the oil passes the two lower grooves 31 in the regular and usual manner. Beyond the second groove, however, the oil on the exhaust port side of the sleeve progresses upwardly from groove to groove, but avoids accumulating about the exhaust port 22 by passing upwardly by way of the inclined channel 33b into the chamber 73 formed by the head 2 and cylinder casting and which is maintained at a sub-atmospheric pressure. The sectional grooves 32a on the intake port side of the sleeves are under the influence of the oil withdrawing device and therefore not only cause the oil in the chamber 73 and the upper portion of the sleeve to be drawn downwardly by way of the channel 33a, but also withdraw any oil which passes upwardly from the two lowermost grooves 31 on the intake port side of the sleeve. For the purpose of assuring subatmospheric pressure in the chamber above the sleeves and thereby facilitating the upward movement of the oil, direct communication with the intake manifold may be maintained by the channel 34. This, however, is optional and may be omitted thereby relying solely upon the vacuum tank 42 for maintaining the desired circulation of oil. Such a condition is realized in the modification illustrated in Fig. IV. The modification is distinguishable however, in that the two lowermost parallel grooves are made in sections similar to grooves 32a and 32b, whereby the upward and downward flow of oil is realized from the base of the sleeve. Obviously, the influence of the oil withdrawing mechanism may be sufficient to cause some of the oil on the exhaust port side of the sleeve to be drawn around the sleeve and to be withdrawn without passing upwardly into the chamber above the sleeve.

In either of the modifications illustrated it will be apparent that the sleeves are divided into portions of predetermined area over each of which oil has a definite trend or flow. This flow is made possible in part by the reciprocative movement of the sleeves and in part by the application of manifold suction to the grooves. By reason of the reciprocative movement of the sleeves the several laterally adjacent grooves are cooperative and in a sense communicative with each other insofar as they function to distribute and convey the oil from one groove to the next adjacent groove. The area of the sleeve adjacent a groove or set of grooves, such as the three laterally adjacent grooves 32a or 32b, forms a grooved portion over which oil has a definite trend or flow. Thus in the operation of the engine, oil passes progressively upwardly from a groove 32b to the next adjacent groove 32b distributing itself evenly over the adjoining portion of the sleeve. Subsequently, it is drawn to the top of the sleeve through groove 33b which is inclined to the axis of the sleeve in order to improve the distribution of the oil over the upper portion of the sleeve. The area of the sleeve opposite that described by grooves 32b is a second portion which is under the influence of the grooves 32a. Over this area the oil is drawn to the slot 36 from whence it is sucked out of the cylinder through the tube 45.

In the claims the term "grooved portion" is employed to designate an area of a sleeve over which the oil flows in a predetermined direction, the direction may be established and governed by the interposition of grooves.

From a consideration of the invention it will be obvious that there is provided a lubricative system in which the oil is caused to pass upwardly on the exhaust port side of the sleeve thereby lubricating the upper portion of the sleeve without permitting oil to penetrate the combustion chamber. On the other hand, any excess of oil which contacts the intake port side of the sleeve is withdrawn therefrom by an evacuating mechanism and which prevents its entrance into the piston chamber. By means of the present invention a definite flow of oil is established whereby all parts of the sleeves are lubricated and accumulations of oil in the neighborhood of the intake port of the sleeve are minimized. At the same time adequate lubrication of all parts, particularly the exhaust port side which is subjected to the greatest heat, is secured.

Although there is described and illustrated but a single embodiment of the principles of my invention together with a few minor modifications, it will be apparent to those skilled in the art that the invention is susceptible to many other modifications without departing from its scope and I desire therefore that it be limited only as indicated in the appended claims.

I claim:

1. In a sleeve valve engine having an intake manifold, a valve mechanism including a cylindrical sleeve having intake and discharge ports, said sleeve being grooved whereby oil is caused to flow upwardly on one portion of the sleeve and away from the intake port on a second portion of the sleeve adjacent the intake ports and means associated with the sleeve and operatively disposed with respect to the manifold for creating sub-atmospheric pressure thereby establishing a flow of oil from one portion of the sleeve to the other.

2. In a sleeve valve engine, a valve mechanism including a cylindrical sleeve having intake and exhaust ports, and a plurality of groove portions, said grooves in each portion being in communicative relation with each other and with a chamber common to both portions, and an additional groove interconnecting the intake port and the chamber adapted to reduce the pressure in the space above the sleeves.

3. In a sleeve valve engine, a chamber and a valve mechanism including a cylindrical sleeve having intake and exhaust ports and a plurality of groove portions, the grooves in each portion being in communication with each other, at least one of said portions being in communicative relation with the chamber, an additional groove interconnecting the intake port and the chamber adapted to maintain a partial vacuum in the chamber thereby creating an upward flow of oil on the surface of the sleeve, at least one other groove portion located adjacent the intake port the grooves thereof being independent of the grooves of the other portions, and means operatively associated with the last named groove portion for creating a partial pressure in the region of the grooves thereby establishing a flow of oil away from the region of the intake port.

4. In a sleeve valve engine, a chamber and a valve mechanism including a cylindrical sleeve having intake and exhaust ports, and a plurality of groove portions, the grooves in each portion being in communication with each other, at least one of said groove portions being in communicative relation with the chamber in the head of the cylinder block; a groove interconnecting the intake port and the chamber adapted to reduce the pressure within the chamber thereby creating an upward flow of oil, at least one other of the groove portions being located adjacent the intake port, the grooves thereof being independent of other grooves, and means operatively disposed with respect thereto for creating a partial pressure in the region of the intake port thereby establishing a flow of oil away from the intake port.

WALTER S. FISHER.